United States Patent
Rondestvedt, Jr.

[15] 3,681,454
[45] Aug. 1, 1972

[54] AROMATIC ACID CHLORIDE PROCESS

[72] Inventor: Christian S. Rondestvedt, Jr., Wilmington, Del.

[73] Assignee: E. I. du Pont de Nemours and Company, Wilmington, Del.

[22] Filed: Nov. 10, 1969

[21] Appl. No.: 875,544

[52] U.S. Cl. ..........................260/544 M, 260/465 D
[51] Int. Cl...............................................C07c 51/58
[58] Field of Search......................260/544 R, 524 M

[56] References Cited

FOREIGN PATENTS OR APPLICATIONS 698,416  11/1964  Canada

Primary Examiner—Lorraine A. Weinberger
Assistant Examiner—Richard D. Kelly
Attorney—Francis J. Crowley

[57] ABSTRACT

Process for preparing aromatic acid chlorides such as isophthaloyl chloride and terephthaloyl chloride, useful as intermediates for making polyester, polyamide and the like condensation polymers, which basically consists of contacting an aromatic compound containing at least one trichloromethyl group bonded to an aromatic carbon atom with a phosphorus compound, $P_2O_5 \cdot xM_{2/q}O$, where $x$ is a number from zero to five inclusive and M is hydrogen or a salt-forming metal of valence $q$, at a temperature and pressure and for a time sufficient to convert at least one trichloromethyl group to an acid chloride group.

17 Claims, No Drawings

AROMATIC ACID CHLORIDE PROCESS

The subject invention relates to a process for converting trichloromethyl-substituted aromatic compounds to aromatic acid chlorides by reaction with phosphoric anhydride, a phosphoric acid or a salt thereof at elevated temperatures.

BACKGROUND

Aromatic acid chlorides are valuable intermediates, particularly poly acid chlorides, such as isophthaloyl chloride and terephthaloyl chloride, useful for making polyester, polyamide and the like condensation polymers. Economically attractive intermediates to the acid chlorides are trichloromethyl-substituted aromatic compounds, obtainable by chlorinating methyl-substituted aromatic compounds by methods well known to the art. The methods proposed heretofore, however, for converting the trichloromethyl compounds to the acid chlorides, notably hydrolysis, reaction with organic acids or salts thereof, or reaction with selected metal oxides, are not entirely satisfactory, particularly from the commercial standpoint of overall production cost, influenced by reagent costs and by-product utility as well as product yield.

U.S. Pat. No. 2,856,425 describes converting aromatic trihalomethyl compounds to aromatic acid chlorides by heating (above 50° C. and preferably between 150° and 300° C.) with oxides of 4th and 5th group metals having atomic numbers in the 22 to 51 range, including specifically Ti, V, As, Zr and Sb.

The choice of oxide is apparently critical. The patent states that only the selected metal oxides give smooth reactions and pure products; that many other metal oxides react with trichloromethyl groups, but violently in many cases, with unwanted by-products resulting in major proportions. Furthermore "——the purity of the metal oxides profoundly affects the course of the reaction——;" for example, titanium oxides which contain iron oxides or aluminum oxides give unsatisfactory results.

While effective as disclosed, for transforming trichloromethyl to chloride groups, the metal oxides appear to have certain drawbacks which add to the process cost. For example:

a. The metal oxides tend to be expensive, particularly because of the purity requirement.

b. The metal halides and oxyhalides, formed as by-products of the reaction, are relatively high boiling and in some cases difficult to separate from the organic acid chloride.

c. Because the reaction is metathetical, the metal halide or oxyhalide is also produced in rather large amounts. Where the available commercial outlets cannot absorb such quantities, they must be stored or transformed into useful materials.

d. According to the patent, the reaction system must be substantially anhydrous to avoid highly detrimental results.

Davies and Dick, J. Chem. Soc. 2808 (1932), discloses that various oxides (ZnO, hydrated $ZnCl_2$, Cd and Pb oxides and $Fe_2O_3$) convert benzotrichloride to benzoyl chloride to some degree on heating at 100° or 120° C., but that "$P_2O_5$ does not react at all." This disclosure is not inconsistent with the above patents on metal oxide criticality.

Abkin and Medvedev, J. Chem. Ind. (Moscow) 1934, No. 1, 30–34 (as summarized in Chem. Abstracts 28, 3051), disclose that benzotrichloride and water react at 240° C. in the vapor phase over tin phosphate supported on pumice to yield benzoyl chloride in 95 percent yield.

What is thus needed is an economically attractive process for converting aromatic $CCl_3$ groups to $COCl$ groups which avoids many of the disadvantages in the prior art methods, especially a process which effects the -$CCl_3$ to -$COCl$ reaction smoothly without introducing additional substituents into the aromatic rings and which utilizes readily available, relatively low cost reagents.

BRIEF SUMMARY OF THE INVENTION

These needs are satisfied by the subject novel process for preparing aromatic acid chlorides by contacting (a) an aromatic compound containing at least one trichloro-methyl group bonded to an aromatic carbon atom (usually a benzene with one to three trichloromethyls on nonadjacent ring positions and zero to three other substituents taken from halo, alkyl, haloalkyl, alkoxyl, cyano, nitro and carbonyl chloride) with (b) at least about $1/(3+x)$ molecules [preferably about $1/(3+x)$], per trichloromethyl group, of a phosphoric oxide, acid or salt thereof of the empirical formula $P_2O_5 \cdot xM_{2/q}O$, where $x$ is a number from zero to five inclusive and M is hydrogen or a salt-forming metal of valence $q$, at a temperature (at least 100° C., preferably about 150°–300° C. and pressure (normally atmospheric) and for a time sufficient to convert at least one trichloromethyl group to an acid chloride group; and recovering the resultant aromatic acid halide.

The phosphorus reactant can be, illustratively, phosphorus pentoxide, polyphosphoric acid, pyrophosphoric acid, ortho-phosphoric acid, ortho-phosphoric acid containing 15 percent by weight of water, salts of such acids such as calcium phosphate, and mixtures thereof, $P_2O_5$ being a preferred reactant.

The trichloromethyl compounds are preferably benzenes bearing one to two trichloromethyl groups on nonadjacent ring positions and zero to three other substituents as listed above, e.g., benzotrichloride, α,α,α-trichloro-m-toluyl chloride, and 1,3- or 1,4-bis(trichloromethyl)benzene bearing zero to three ring chloro groups. The reaction by-products, phosphorus oxychloride and (when $x$ is greater than O and M is hydrogen) hydrogen chloride, are generally distilled from the reaction mass, preferably continuously as formed, prior to recovering the aromatic acid chloride. Metal chlorides, formed when M is a metal, are relatively non-volatile and insoluble in organic solvents so that the organic acid chlorides are readily separable therefrom by distillation or solvent extraction.

DETAILED DESCRIPTION OF THE INVENTION

The invention is based on the discovery that the defined phosphoric acids and anhydride are highly effective for converting a wide variety of aromatic trichloromethyl compounds to the corresponding aromatic acid chlorides. Such effectiveness is especially unexpected considering that U.S. Pat. No. 2,856,425 teaches that only certain metal oxides give good results in such reaction (thereby excluding oxides of phosphorus, which is non-metallic) and that Davies and Dick, J.C.S. 2808 (1932) teaches $P_2O_5$ is inoperative for this purpose.

Phosphorus oxychloride and hydrogen chloride, by-products in the process of this invention, are well known, widely useful industrial chemicals. They are sufficiently volatile (more so than the metal halides and oxyhalides of the above prior art process) to be readily and cleanly separated from the aromatic acid chloride reaction product, and likewise may be obtained in high yields.

Thus in employing readily available and relatively low cost phosphorus oxide and hydroxide reagents and producing economically valuable by-products along with the desired aromatic acid chlorides, the subject process constitutes an important advance in the art.

In the broad aspect of the subject process, an aromatic compound containing one or more trichloromethyl groups (as defined) and a phosphoric oxide (as defined) are contacted at elevated temperatures to effect the transformation of one or more trichloromethyls ($CCl_3$) to carbonyl chloride ($COCl$) groups. The reaction stoichiometry may be represented as

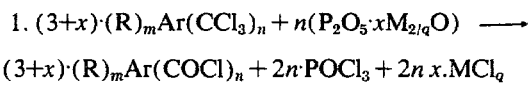

$$(3+x)\cdot(R)_mAr(COCl)_n + 2n\cdot POCl_3 + 2n\,x.MCl_q$$

where Ar, R, M, $m$, $n$, $q$ and $x$ are as defined below.

The aromatic trichloromethyl compounds that can be converted into acid chlorides in the invention process can vary widely so long as the corresponding aromatic carbonyl chlorides are capable of existence and are sufficiently stable under the defined thermal conditions to be recovered from the reaction mass. They may be broadly represented as $(R)_mAr(CCl_3)_n$, where Ar stands for an aromatic nucleus, R is H or a non-interfering substituent and $m$ and $n$ are integers of at least one each which together satisfy the valence of the aromatic nucleus, and, when two or more trichloromethyls are present they are on non-adjacent positions.

Thus the aromatic compounds may contain one or more non-adjacent trichloromethyl groups, normally one to three, and preferably one or two, such groups per aromatic ring, and optionally may contain one or more other substituents inert to the acid chloride group under reaction conditions. Preferably the nuclear positions adjacent to at least one trichloromethyl will be free of substituents other than hydrogen. Included are compounds of the benzene (preferred), naphthalene, phenanthrene and anthracene series, also binuclear analogs thereof wherein two aryls, normally phenyls, with one or both carrying one or more trichloromethyl groups, are joined through an electron pair bond, an alkylene group such as methylene, ethylidene, propylidene or butylidene, a carbonyl group, or the like bridging group which is inert under the conditions of the reaction.

Non-interfering R substituents other than hydrogen that may be present along with the trichloromethyls in the compounds to be treated include those which are normally inert to the reactants and products such as: the halogens F, Cl, Br and I; alkyl, normally lower alkyl for reasons of availability, such as methyl, ethyl, isopropyl, tert. butyl; haloalkyl other than trichloromethyl such as chloromethyl, dichloromethyl, $\beta,\beta,\beta$-trichloroethyl and the like lower chloroalkyl groups; fluoroalkyl, such as fluoromethyl, difluoromethyl, trifluoromethyl, pentafluoroethyl, and perfluorobutyl; lower alkoxyl such as methoxy, ethoxy, n-propoxyl, and n-butoxyl; and others such as carbonyl chloride, cyano and nitro.

The R substituents need not be completely unreactive. They need only be sufficiently inert to the carbonyl chloride compound produced in the reaction to allow its recovery. Thus there may be present carboxyl groups, which under the conditions of the reaction are converted to carbonyl chloride groups by reaction with the $POCl_3$ (phosphorus oxychloride) by-product. Likewise the carboxamide group tends to be dehydrated to the inert nitrile group by phosphorus pentoxide and by $POCl_3$ under the reaction conditions.

Representative trichloromethyl compounds are benzotrichloride (trichloromethylbenzene), o-chlorobenzotrichloride, m-chlorobenzotrichloride, p-chlorobenzotrichloride, p-bromo-benzotrichloride, p-iodobenzotrichloride, p-fluorobenzotri-chloride, 3,4-dichlorobenzotrichloride, m-methylbenzotri-chloride ($\alpha,\alpha,\alpha+$-trichloromethyl-m-xylene), 3,4-dimethyl-benzotrichloride, p-tert.butylbenzotrichloride, p-trifluoromethyl-benzotrichloride, m-dichloromethyl-benzotrichloride ($\alpha,\alpha,\alpha,\alpha',\alpha'$-pentachloro-m-xylene), p-methoxybenzotrichloride, m-ethoxybenzotrichloride, p-n-butoxybenzotrichloride, m-cyanobenzotrichloride, p-nitrobenzotrichloride, m-trichloromethylbenzoyl-chloride ($\alpha,\alpha,\alpha$-trichloromethyl-m-toluyl chloride), p-trichloromethylbenzoylchloride, 1,3-bis(trichloromethyl)benzene ($\alpha,\alpha,\alpha,\alpha',\alpha',\alpha'$-hexachloro-m-xylene), 4-chloro-1,3-bis(trichloromethyl)benzene, 1,4-bis(trichloromethyl)benzene, 2,5-dichloro-1,4-bis(trichloromethyl)benzene, 2-chloro-1,3-bis(trichloromethyl)benzene, 2-chloro-1,4-bis(trichloromethyl)benzene, 4,5-dichloro-1,3-bis(trichloro-methyl)benzene, 4,6-dichloro-1,3-bis(trichloromethyl)-benzene, 1,3,5-tris(trichloromethyl)benzene ($\alpha,\alpha,\alpha,\alpha'$-$\alpha',\alpha',\alpha'',\alpha''$,$\alpha''$1-trichloromethyl-naphthalene, 1,5-bis(trichloromethyl)naphthalene, 2-trichloromethylphenanthrene, 1-trichloromethylanthracene, p-trichloromethylbiphenyl, p,p'-bis(trichloromethyl)biphenyl, bis(p-trichloromethylphenyl)methane, 2,2-bis(p-trichloromethylphenyl)propane, and p,p'-bis(trichloromethyl)benzophenone.

Trichloromethyl compounds of the benzene series, which may contain chloro, chloroalkyl, and carbonyl chloride groups, represent an important reactant class, especially 1,3-bis(trichloromethyl)benzene and 1,4-bis(trichloromethyl)benzene, since the corresponding acid chlorides enjoy wide utility. It will be noted that the hexachlorometa- and p-xylenes obtained by side chain chlorinating the parent aromatic hydrocarbons may contain ring chlorinated derivatives, as exemplified above. Such ring chlorinated trichloromethyl-containing materials may also be converted simultaneously to the corresponding ring chlorinated acid chlorides by the process of this invention.

Included among the phosphoric oxides having empirical formula $P_2O_5 \cdot xH_2O$ are phosphoric anhydride ($x=0$) and its hydrated products, including metaphosphoric acid (having the empirical formula $HPO_3$, which may be represented as $H_2P_2O_6$ or $P_2O_5 \cdot H_2O$), polyphosphoric acid ($P_2O_5 \cdot 1.5H_2O$ or $H_6P_4O_{13}$), pyrophosphoric acid ($P_2O_5 \cdot 2H_2O$ or $H_4P_2O_7$), phosphoric acid ($P_2O_5 \cdot 3H_2O$ or $H_3PO_4$) and 85 percent phosphoric acid ($P_2O_5 \cdot 5H_2O$ or $H_3PO_4 \cdot H_2O$). Mixtures of any two or more of these anhydrides and acids may be used.

The anhydride, or phosphorus pentoxide, is preferred, most preferably the powdery, apparently amorphous material, produced by burning phosphorus in excess air or oxygen, often represented as $P_4O_{10}$ and commonly used as a drying agent. Other, crystalline forms may be used, such as the relatively volatile material obtained by subliming the amorphous powder.

The equation (1) stoichiometry requires ⅓ molecule of phosphorus pentoxide per $CCl_3$ group to be converted, and best results are obtained with such proportions. With smaller proportions conversions are incomplete. With $P_2O_5$ proportions exceeding about 10 mole percent excess, the acid chloride yield tends to be decreased. Similarly, at least about $1/(3+x)$ molecules of the phosphoric acids described above and empirically expressed as $P_2O_5 \cdot xH_2O$ are required and are normally employed in this process.

As equation (1) indicates, the quantity of bound water (defined by $x$) determines the quantity of HCl produced. Where HCl formation is to be minimized, substantially anhydrous phosphorus pentoxide is employed.

Included among the phosphoric oxides wherein M is a salt-forming metal of valence $q$ are the metal salts of the defined phosphoric acids. The salts are normally alkali metal ($q = 1$) or alkaline earth metal ($q = 2$) orthophosphates or pyrophosphates, for reasons of availability, although others such as the iron ($q = 3$) and aluminum ($q = 3$) salts may be used. Particularly attractive for reasons of economy are the calcium compounds, including the abundantly occurring minerals phosphorite (phosphate rock), $Ca_3(PO_4)_2$, apatite, $3Ca_3(PO_4)_2 \cdot Ca(F, Cl)_2$, and others such as fluorapatite, chloroapatite, hydroxyapatite and carbapatite which contain magnesium, iron, manganese and other components in small amounts. Also included are various manufactured forms such as monobasic, dibasic and tribasic calcium phosphate, calcium superphosphate, calcium pyrophosphate, and antimoniated calcium phosphate.

The metal phosphorus compounds, solids, are preferably finely divided, to present high surface areas in contact with the trichloromethyl compounds. The metal moieties are converted into metal chlorides (equation 1), separable from the aromatic acid chlorides by distillation or solvent extraction.

Since the phosphorus reactants are relatively nonvolatile, intimate contact with the trichloromethyl compound is obtained simply by heating a mixture, preferably under agitation, to provide a liquid reaction mass or at least a slurry of the phosphorus reagent in liquid trichloromethyl compound where the phosphorus reactant is high melting or insoluble in the mixture. Temperatures of at least about 100° C. are required for reaction. Preferred temperatures are 150° to 300° C., most preferably between 200° and 280° C. The reaction is normally conducted at atmospheric pressures although higher or lower pressures can be used if desired.

As reaction occurs, phosphorus oxychloride forms and as the temperature is increased, it begins to vaporize from the reaction mass. When a phosphoric acid is employed, the hydrogen chloride that also forms also vaporizes from the system. In one embodiment the reaction is conducted under a fractionating column and the $POCl_3$, b.p. 105° C., is simply distilled away from the higher boiling aromatic acid chloride, the simplest member of which, benzoyl chloride, boils at 190° C. If desired the $POCl_3$ and any HCl present may be stripped from the reaction mass under reduced pressures. Since in general the acid chlorides boil lower than the starting trichloromethyl compounds and the phosphoric oxides, the acid chloride product may also be distilled out, either intermittently or continuously, as formed. Further, the process may be made semi-continuous or continuous, by intermittently or continuously feeding to the reactor maintained at operating temperatures a mixture of trichloromethyl compound and phosphoric reactant and distilling the inorganic and the aromatic chloride products from the reaction system at the same rate.

Where necessary, the higher boiling aromatic acid chloride may be distilled at reduced pressures as disclosed in British Pat. No. 946,491 and in U.S. Pat. No. 2,856,425. Where the acid chloride is normally solid or not distillable it may be purified if desired by crystallization from melts or from solvents as is also well known to the art.

One feature of this invention is that reaction solvents are normally not needed. They may be used, however, and in some cases afford substantial benefits by facilitating the desired reaction. Useful diluents include phosphorus oxychloride, the aromatic acid chloride to be produced, and typical inert solvents such as chlorobenzene, ortho-dichlorobenzene and 1,2,4-trichlorobenzene.

Still another feature of the invention is that moisture need not be excluded from the reaction system since phosphoric anhydride, its partially hydrated products, and $POCl_3$ all avidly scavenge water, yielding phosphoric acids as defined and, in addition, when $POCl_3$ is hydrolyzed, the HCl formed readily volatizes from the reaction system. Gross amounts of water are to be avoided as they adversely affect yields of the desired products.

Catalysts are not ordinarily needed although polyvalent metal compounds having Lewis acid character are sometimes beneficial to facilitate the reaction, for example polyvalent metal chlorides of B, Mg, Al, Ti, Fe, As, Sn, Sb or Hg, in small amounts, such as 0.001 to 0.1 mole per $CCl_3$ group, particularly $SbCl_5$, 0.002–0.02 per $CCl_3$ group.

EXAMPLES

The following examples are intended to illustrate the invention and are not intended to be in limitation thereof.

Other materials and conditions as described above may likewise be employed with advantageous results.

Quantities where given are in parts by weight, temperatures in °C. Pressures, when not stated, are atmospheric.

Example 1

Benzotrichloride (193 parts - about one mole) and phosphorus pentoxide (48 parts - about ⅓ mole) were stirred while being heated under a fractionating column to 190° C. Phosphorus oxychloride was removed overhead while the temperature was gradually raised to 225° C. When the removal of $POCl_3$ was substantially complete, the residual mass was distilled at reduced pressures to obtain benzoyl chloride in near quantitative yield.

Examples 2 to 8

Good yields are also obtained with the procedure of Example 1 on employing the substituted benzotrichlorides listed below at reaction temperatures of 230° to 285° C.:

| Example | Benzotrichloride |
|---|---|
| 2 | o-chloro |
| 3 | m-fluoro |
| 4 | 2,4-dichloro |
| 5 | p-methyl |
| 6 | m-dichloromethyl |
| 7 | m-carbonyl chloride |
| 8 | m-cyano |

In each example the corresponding benzoyl chloride is produced. In Example 7, the dichloride product is isophthaloyl chloride.

Example 9

1,3-Bis(trichloromethyl)benzene, containing a few percent by weight of $\alpha,\alpha,\alpha,\alpha',\alpha'$-pentachloro-m-xylene and 4-chloro-1,3-bis(m-trichloromethyl)benzene, was heated with a two-thirds molar proportion (i.e., ⅓ per $CCl_3$) of commercially available "Granusic" phosphorus pentoxide (granular $P_2O_5$) at 250° to 290° under a fractionating column. Phosphorus oxychloride was distilled off as formed at atmospheric pressure, and when no more distilled, the residual mass was distilled at reduced pressure to obtain isophthaloyl chloride in 86 percent yield and containing about 1 percent each of m-dichloromethylbenzoyl chloride and 4-chloroisophthaloyl chloride.

Examples 10 to 15

The procedure of Example 9 can be used to prepare other diacid chlorides from other 1,3- and 1,4-bis(trichloromethyl)benzenes as listed below:

| Example | Substituted Benzene | Di-Acid Chloride |
|---|---|---|
| 10 | 1,4-$(CCl_3)_2$ | terephthaloyl chloride |
| 11 | 2-Cl-1,4-$(CCl_3)_2$ | 2-chloro-terephthaloyl chloride |
| 12 | 2,5-$Cl_2$-1,4-$(CCl_3)_2$ | 2,5-dichloro-terephthaloyl chloride |
| 13 | 4-Cl-1,3-$(CCl_3)_2$ | 4-chloro-isophthaloyl chloride |
| 14 | 4,6-$Cl_2$-1,3$(CCl_3)_2$ | 4,6-dichloro-isophthaloyl chloride |
| 15 | 4,5,6-$Cl_3$-1,3$(CCl_3)_2$ | 4,5,6-trichloro-isophthaloyl chloride |

Example 16

A mixture of 1,3-bis(trichloromethyl)benzene (93.9 grams) and 85 percent phosphoric acid (17.5 grams, the stoichiometric amount) was heated under a small Vigreaux distillation column. HCl evolution began at about 115° and became vigorous at about 185°. At 274°, the mixture began to foam excessively, so the heater was removed at intervals until foaming became manageable, whereupon the mixture was heated for an additional 25 min. at 290°. The distillate up to this point was water-soluble without heat evolution and was discarded. The mixture was then distilled (at 113° – 128°/1 mm Hg pressure) to yield 72.2 grams of distillate containing isophthaloyl chloride, $\alpha,\alpha,\alpha$-trichloro-m-toluyl chloride, and unreacted 1,3-bis(trichloromethyl)benzene.

Example 17

A mixture of 93.9 grams of 1,3-bis(trichloromethyl)benzene (designated HCMX below) and 0.2 ml. of $SbCl_5$ (about 0.0025 mole/$CCl_3$ group) was heated to 137°, and slow addition of 17.5 grams of 85 percent phosphoric acid was begun. The temperature was maintained at 140° – 150° during the 90-min. addition. HCl was evolved copiously. Sample 1 was taken. The mixture was then heated slowly to 280° during one hr.; sample two was taken. The material was heated at 273° – 280° for two hrs. longer, during which $POCl_3$ was distilled overhead. The pot residue was then vacuum-distilled to yield 53.7 grams of distillate, b.p. 103° – 120° at 1 mm of Hg pressure. Vapor phase chromatographic analysis of the samples and distillate showed:

| | $ICl^a$ | $TCTC^b$ | HCMX | Total Conversion |
|---|---|---|---|---|
| Sample 1 | 4.5% | 39.0% | 56.5% | 24.0% |
| Sample 2 | 23.8 | 49.9 | 26.3 | 48.8 |
| Distillate | 66.7 | 31.4 | 1.8 | 82.4 | a. Isophthaloyl chloride
b. $\alpha,\alpha,\alpha$-trichloro-m-toluyl chloride

The distillate, most of which had solidified, was recrystallized twice from hexane to yield pure isophthaloyl chloride, m.p. 42.1°–43.7°.

Example 18

A mixture of 93.9 parts (0.3 mole) of 1,3-bis-(trichloromethyl)benzene and 31.0 parts (0.1 mole) of technical tricalcium phosphate was heated under a small Vigreaux distillation column, using a motor-driven stirrer to provide adequate mixing. A reaction mass temperature of 290° was reached in 23 minutes. $POCl_3$ began to distill smoothly and was collected, and the pot temperature slowly fell. After about an hour, when the temperature had fallen to 282° and distillate began to turn yellow, the reaction was stopped by cooling.

The cooled reaction mixture was stirred with methylene chloride, and filtered. Evaporation of the solvent left 50 parts of product containing 46.1 percent of isophthaloyl chloride, 42.3 percent of $\alpha,\alpha,\alpha$-trichloromethyl-m-toluyl chloride, and 11.5 percent of starting hexachloride, corresponding to 67.3 percent conversion.

The acid chlorides are separable from each other and from the starting material by distillation as in the above examples.

The foregoing detailed description has been given for clearness of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing aromatic acid chlorides which consists essentially of contacting (a) an aromatic compound consisting of (1) compounds of the benzene, naphthalene, phenanthrene and anthracene series or (2) compounds having two benzene nuclei joined by a direct linkage, a carbonyl group or a $C_{1-4}$ alkylene group said aromatic compound having one or more trichloromethyl groups bonded to nonadjacent aromatic carbon atoms with (b) at least about $1/(3+x)$ molecules, per trichloromethyl group, of a phosphorus compound, $P_2O_5 \cdot xM_{2/q}O$ where $x$ is a number from zero to five inclusive and M is hydrogen or a chloride-forming metal of valence $q$, at a temperature of at least 100° C. and pressure and for a time sufficient to convert at least one trichloromethyl group to an acid chloride group; and recovering the resultant aromatic acid chloride.

2. Claim 1 wherein the amount of phosphorus compound is about $1/(3+x)$ molecules per trichloromethyl group.

3. Claim 2 wherein the phosphorus compound is $P_2O_5 \cdot xH_2O$ and is selected from phosphorus pentoxide, polyphosphoric acid, pyrophosphoric acid, ortho-phosphoric acid, ortho-phosphoric acid containing 15 percent by weight of water and mixtures thereof.

4. Claim 3 wherein the phosphorus reactant is phosphorus pentoxide.

5. Claim 3 wherein the aromatic compound is a benzene bearing one to two trichloromethyls and zero to three other substituents selected from halo, alkyl, haloalkyl, alkoxyl, cyano, nitro and carbonyl chloride.

6. Claim 5 wherein the temperature is about 150° – 300° C. and the pressure is atmospheric.

7. Claim 6 wherein the temperature is about 200° – 250° C. and by-product phosphorus oxychloride is distilled off as formed prior to recovering said aromatic acid chloride.

8. Claim 7 wherein $x$ is greater than zero and by-products phosphorus oxychloride and hydrogen chloride are continuously distilled off as formed prior to recovering said aromatic acid chloride.

9. Claim 6 wherein the aromatic compound is benzotrichloride.

10. Claim 6 wherein the aromatic compound is $\alpha,\alpha,\alpha$-trichloro-m-toluyl chloride.

11. Claim 6 wherein the aromatic compound is 1,3-bis(trichloromethyl)benzene bearing zero to three ring chloro groups.

12. Claim 6 wherein the aromatic compound is 1,4-bis(trichloromethyl)benzene bearing zero to three ring chloro groups.

13. Claim 2 wherein M is a chloride-forming metal.

14. Claim 13 wherein M is an alkali or alkaline earth metal.

15. Claim 14 wherein M is calcium.

16. Claim 15 where the calcium compound is a calcium phosphate.

17. Claim 16 wherein the aromatic compound is 1,3- or 1,4-bis(trichloromethyl)benzene bearing zero to three ring chloro groups.

* * * * *